United States Patent [19]

Flickinger

[11] 4,364,442
[45] Dec. 21, 1982

[54] DIGITAL SCALE
[75] Inventor: Jon M. Flickinger, Salina, Kans.
[73] Assignee: L. & D. Sales Corporation, Salina, Kans.
[21] Appl. No.: 236,262
[22] Filed: Feb. 20, 1981
[51] Int. Cl.³ ............................................ G01G 3/142
[52] U.S. Cl. ................................ 177/177; 177/211; 177/DIG. 3
[58] Field of Search ................ 177/211, DIG. 3, 229, 177/50, 25, 177

[56] References Cited

U.S. PATENT DOCUMENTS

| | | | |
|---|---|---|---|
| 4,139,069 | 2/1979 | Domis | 177/50 X |
| 4,139,892 | 2/1979 | Gudea | 177/50 X |
| 4,158,396 | 6/1979 | Suzuki | 177/DIG. 3 |
| 4,174,760 | 11/1979 | Curchod | 177/211 |
| 4,177,868 | 12/1979 | Sanders | 177/211 |
| 4,219,089 | 8/1980 | Gard | 177/211 X |

FOREIGN PATENT DOCUMENTS 2026270  1/1980  United Kingdom .............. 177/211

Primary Examiner—Joseph W. Hartary
Attorney, Agent, or Firm—John H. Widdowson

[57] ABSTRACT

A digital scale and circuitry therefor, includes a power supply electrically connected to a control logic circuitry and a bridge supply circuitry. The bridge supply circuitry is electrically attached to a strain gage bridge which is electrically connected to an amplifier circuitry. The amplifier circuitry electronically engages an AD converter which electrically connects to a logic circuit and the control logic circuitry. The logic circuit and the control logic circuitry are electrically interconnected and each electrically attach to a display driver circuitry for displaying digits on a digital screen.

6 Claims, 8 Drawing Figures

DIGITAL SCALE

BACKGROUND OF THE INVENTION

1. Field of the Invention

This invention is related to a digital scale. More specifically, this invention provides a digital scale and circuitry therefor including the provision of strain gages.

2. Description of the Prior Act

U.S. Pat. Nos. 4,050,532 and 4,023,634 by Provi et al, teach the use of strain gages and voltage changes applied to the input of an analog to digital converter, and subsequently to a digital readout. U.S. Pat. No. 3,589,457 by Joos teaches a similar type scale as Provi et al. None of the foregoing teaches or suggest digital scale and circuitry therefor of this invention.

SUMMARY OF THE INVENTION

It is therefore an object of this invention to provide a digital scale and circuitry therefor.

It is another object of this invention to provide a digital scale having the provision of strain gages that are connected to a bridge wherein voltage changes occurring are amplified to the input of an A-D converter for changing the voltage into a digital format, processed by a logic circuit and disclosed and displayed in a readout device.

Broadly, this invention accomplishes the foregoing objects by providing a digital scale, and circuitry therefor, comprising a power supply electrically connected to a control logic circuitry and a bridge supply circuitry which is electrically attached to a strain gage bridge. The strain gage bridge electrically engages an amplifier which is electrically connected to an A-D converter. The A-D converter electronically attaches to a logic circuit and a control logic circuit which are electrically interconnected and both attach to a display driver circuitry for displaying digits on a digital screen.

DETAILED DESCRIPTION OF THE INVENTION

Figure 1:
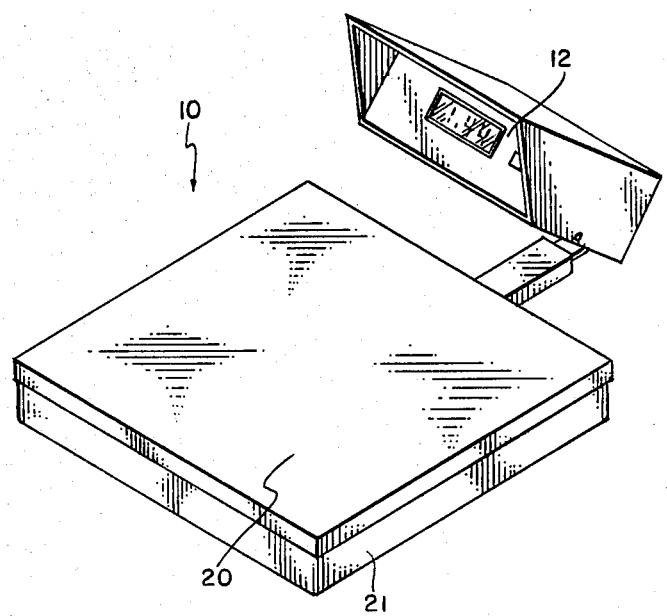
FIG. 1 is a perspective view of the digital scale.
Figure 2:
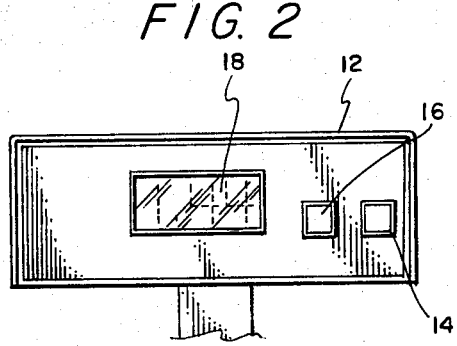
FIG. 2 is a front elevational view of the display screen.
Figure 4:
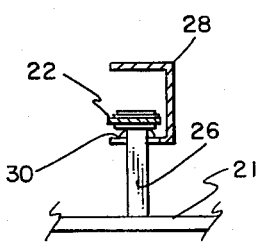
FIG. 4 is a partial vertical sectional view disclosing the beam having strain gages attached thereto, along with the support posts and mounting surface.

Referring in detail now to the drawings, wherein like reference numerals designate similar parts throughout the various views, there is seen the digital scale, generally illustrated as 10, comprising a display module 12 including an on-off power supply switch 14, an autotare switch 16, and a display screen 18. Digital scale 10 also includes a weigh plate 20, a base 21, a pair of beams 22 (only one being shown in the drawings) with an upper strain gage 24 and a lower strain gage 26 properly attached to each beam 22 on opposite sides thereof. Beams 22 are supported by a pair of support posts 26 which connect to base 21. Two U-shaped mounting members 28 (only one disclosed in drawings) are mounted on each beam 22 by means of a pivot mounting assembly 30. Weigh plate 20 rests of U-shaped mounting members 28.

Figure 5:
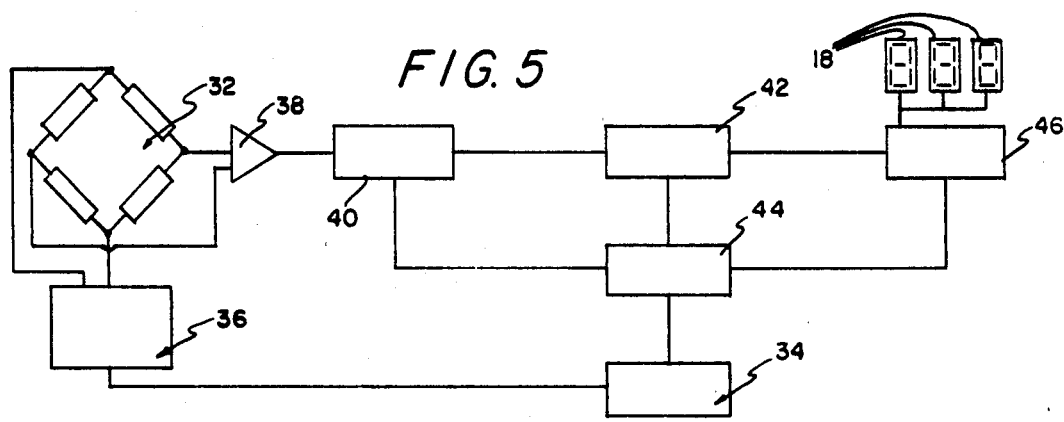
FIG. 5 is a schematic blade diagram of the digital scale and circuitry therefor.

FIG. 5 discloses the digital scale block diagram of this invention and illustrates the operation of the invention which is accomplished by my novel circuitry which will be described hereinafter. Strain gages 24 and 26 are oppositely mounted on beams 22 so that when beams 22 are flexed, the upper strain gage 24 is stretched while the lower strain gage 26 is compressed. Therefore, the resistance of the upper strain gage 24 increases while the resistance of the lower strain gage 26 decreases. Beams 22 are electrically connected to form a strain gage bridge, generally illustrated as 32. Power supply means, generally illustrated as 34, delivers power to strain gage bridge 32 via bridge supply means 36 in order to supply a current through the gages 24 and 26 which then allows the small resistance changes in the gages 24 and 26 to be detected as voltage changes. This small voltage change is then amplified by amplifier 38 and applied to the input of an analog of A-D converter 40 to digitally convert the voltage to a digital format which is processed with the aid of logic circuit means 42 and control logic circuit means 44 and subsequently displayed in pounds on display screen 18 by display driver 46. Preferably, the A-D converter 40 is the integrating dual-slope type which allows the digital logic circuit means 42 to compare a reference count of clock pulses to an unknown count of pulses that are determined by the input of the bridge 32. This comparison then yields the resultant net weight as seen on the display screen 18. When the a button 16 is pushed, the logic circuits 42 and 44 interally store and control the number of the display screen 18 at that time, and subsequently subtracts this number from any subsequent readings. If a tared weight is removed from the weigh table, the logic circuit 42 and control logic circuit 44 will cooperately detect if the net weight drops below zero; and if so, the circuits 42 and 44 proceed to automatically tare itself.

All operating voltages are provided by the power supply means 34, electrically connected to bridge supply 36 and control logic 44, and is preferably either an AC line supply means, generally illustrated as 48, (see FIG. 6) or a battery circuit means (see FIG. 7), generally illustrated as 50.

Figure 6:
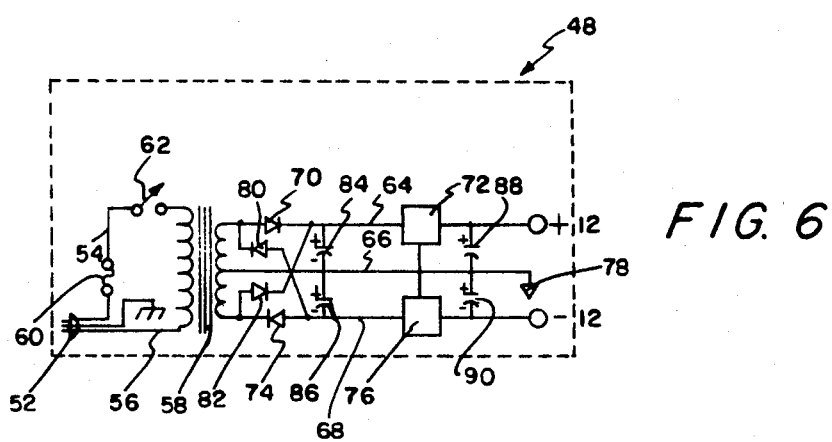
FIG. 6 is the circuitry for the AC line supply.

FIG. 6 illustrates the novel circuitry for the AC line supply wherein input terminal 52 includes conductors 54 and 56 connected to transformer 58. Conductor 54 has a fuse 60 and an on-off switch 62 in series. Extending from transformer 58 are conductors 64, 66, and 68. Conductor 64 includes diode 70 and +12 volt regulator I.C. (integrated circuit); and conductor 68 has diode 74 and −12 volt regulator I.C. Conductor 66 has diode 78. Diodes 80 and 82 electrically interconnect conductors 64 and 68 as illustrated. Capacitors 84 and 88 interconnect conductors 64 and 66; and capacitors 86 and 90 electrically interconnects conductors 66 and 68, as shown.

Representative comparent designations and preferred circuit values for the FIG. 6 circuit are:

| | |
|---|---|
| Fuse 60 | ¼ A |
| Capacitors 84 and 86 | 1000/16 |

| -continued | |
|---|---|
| Capacitors 88 and 90 | 4.7 mf |
| Diode 70, 74, 80, 82 | IN 4004 |
| +12 volt regulator IC | 7812 |
| −12 volt regulator IC | 79L12 |

Figure 7:
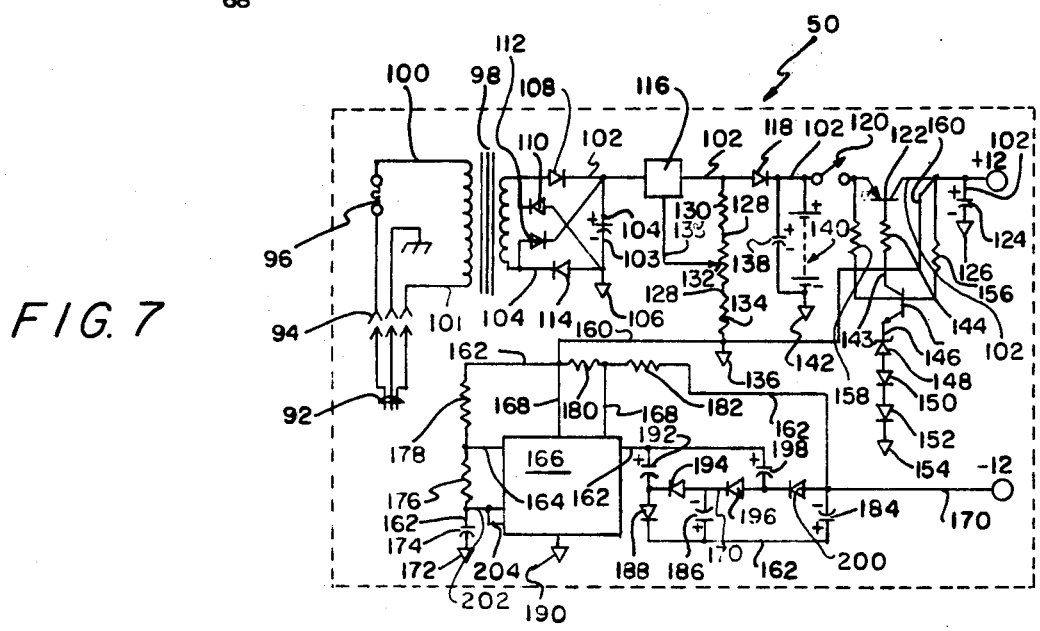
FIG. 7 is the circuitry for the battery supply.

FIG. 7 illustrates the novel circuitry for the battery supply having rechargeable means through the use of input terminal 92 connecting with conductors 100 and 101 through a connector means 94. Conductor 100 includes a fuse 96 and connects to transformer 98 along with conductor 101. Extending from transformer 98 are conductors 102 and 104. Conductor 104 connects to conductor 102 and has connected therein diodes 114 and 106. Diodes 110 and 112 electrically interconnect conductors 102 and 104 as shown. Conductor 102 comprises connected in series in order stated diode 108, +5 volt regulator F.C. 116, diode 188, on-off switch 120, transistor 122, capacitor 124 and diode 126. Conductor 128 connects to conductor 102 and has connected in series, in order stated, resistor 130, variable resistor 132 having conductor 133 extending from +5 volt regulator IC 116 for variance, resistor 134 and diode 136. Capacitor 138 electrically connects to conductor 102 and extends across a battery 140 which has a diode 142 connecting therefrom. Conductor 143 electrically connects to transistor 122 and includes in series, in order stated, resistor 144, transistor 146, diodes 148, 150, 152 and 154. Resistors 156 and 158 electrically connect from conductor 102 to resistor 146 as shown. Conductor 160 interconnects conductor 102 with an astable multivibrator means 166 which has a diode 190 connecting therefrom. Conductor 162 also connects with conductor 160 and multivibrator means 166 and includes connected therein in series, in order stated, diode 172, capacitor 174, resistor 176, resistor 178, resistor 180, resistor 182, capacitor 184, diode 188, capacitor 192. Conductors 164, 168, 202 and 204 interconnect conductor 162 and multivibrator means 166 as illustrated. Conductor 170 connects to conductor 162 in two places and has attached therein in series diodes 200, 196 and 194. Capacitors 186 and 198 electrically interconnect conductor 170 with conductor 162 as shown in FIG. 7.

Representative component designations and preferred circuit values for the FIG. 7 circuit are:

| Fuse 60 | ½ A |
|---|---|
| Diodes 108, 110, 112, 114, 118 142, and 126 | IN 4004 |
| Diode 148 | 9.1V |
| Diodes 150, 152, 154 | IN 4148 |
| Diodes 172, 190, 188, 194, 196, 200 | IN 4148 |
| Capacitor 103 | 1000/25 |
| Capacitor 138 | 4.7 mf |
| Capacitor 124 | 1000 mf |
| Capacitor 174 | .015 mf |
| Capacitors 192, 186, 198, 184 | 100 mf - 16 v |
| +5 volt regulator IC 116 | 7805 |
| Stable Multivibrator 166 | 555 |
| Resistor 130 | 1.0 KΩ |
| Resistor 132 | 5 KΩ |
| Resistor 134 | 2.2 KΩ |
| Resistors 158, 144 | 820Ω |
| Resistor 156 | 3.9 KΩ |
| Resistor 176 | 10 KΩ |
| Resistor 178 | 1 KΩ |
| Resistor 180 | 22 KΩ |
| Resistor 182 | 47 K |
| Battery 140 | 12 V |
| Transistor 122 | RCP-700D |

| -continued | |
|---|---|
| Transistor 146 | 2N4401 |

Figure 8:
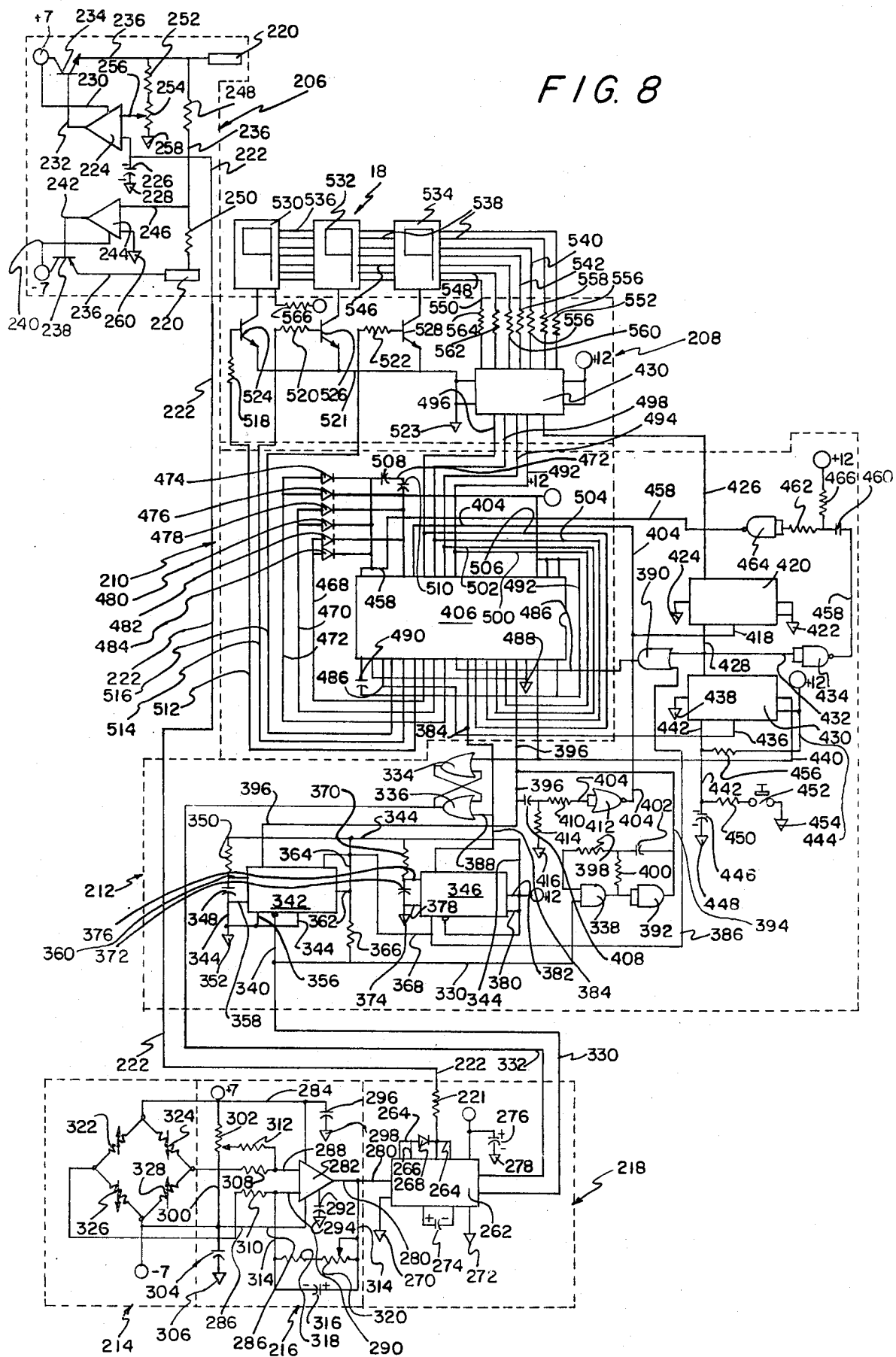
FIG. 8 is the circuitry for the bridge supply, the display driver, the logic, the control logic, the strain gage bridge, the amplifier, and the A-D converter.

FIG. 8 discloses the novel circuitry for the bridge supply means, generally illustrated as 206, the display driver, generally illustrated as 208, the logic means, generally illustrated as 210, the control logic means, generally illustrated as 212, the strain gage means, generally illustrated as 216, and the A-D converter means, generally illustrated as 218.

Bridge supply 206 has power terminals 220 which are connections for the power supply 34. Conductor 222 connects to an operational amplifier 224 and includes a capacitor 226 and circuit common connection 228 in series and extending therefrom. Conductor 230 and 232 extend from operational amplifier 224 and connect to transistor 234. The emitter electrode of transistor 234 has a conductor 236 connected thereto, extending to the emitter electrode of transistor 238. The collector electrode of transistor 238 has conductor 240 extending therefrom to operational amplifier 244. Conductor 242 and conductor 246 electrically interconnect operational amplifier 244 with transistor 238 and conductor 236, respectively. Conductor includes in series resistors 248 and 250. Resistors 252 and variable resistor 254 (having a variance conductor 256 connecting to operational amplifier 224) electrically interconnect the operational amplifier 234 and conductor 236. Circuit common connection 258 connects to resistor 254, and circuit common connection 260 connects to operational amplifier 244.

Representative component designations and preferred circuit values for the bridge supply circuit 206 are:

| Transistor 234 | MPS-A05 |
|---|---|
| Transistor 238 | MPS-A55 |
| Operational Amplifiers 224, 244 | 1458 |
| Circuit Common Connections 228, 260, 258 | — |
| Resistor 252 | 2.0 KΩ |
| Resistor 254 | 1.0 KΩ |
| Resistor 248 | 6.34 KΩ |
| Resistor 250 | 6.34 KΩ |
| Capacitor 206 | 4.7 mf |

Conductor 222 having resistor 221 interconnects the bridge supply circuit 206 with a dual slope analog to digital converter 262 of the A-D converter circuit 218. Conductor 264 having diode 268 connects to conductor 222 and to converter 262 in two places. Conductor 266 interconnects converter 262 with conductor 264. Capacitor 276 and diode 278, in series, electrically extends from converter 262 as illustrated. Also electrically extending from converter 262 are circuit common connections 270, 272 and capacitor 274 (which connects in two places to converter 262).

Representative component designations and preferred circuit values for the AD converter circuit 218 are:

| Resistor 221 | 1.0 KΩ |
|---|---|
| Converter 262 | 1405L |
| Capacitor 276 | 100 mf - 16 v |
| Capacitor 274 | 47 mf - 16 v |
| Diode 268 | IN 4148 |
| Circuit Common Connections 270, 272 | — |

Conductor 280 interconnects the converter 262 with operational amplifier 282 of the amplifier circuit 216. Electrically extending from amplifier 282 are conductors 284, 288, 290, 286 and in series a capacitor 292, circuit common connection 294. Also in series and extending from conductor 284 are capacitor 296 and circuit common connection 298. Conductor 300 having variable resistor 302 and in series, capacitor 304, and circuit common connection 306, electrically interconnects conductor 284 and 286. Conductors 288 and 290 comprise resistors 308 and 310, respectively. Resistor 312 electrically interconnects conductor 288 and variable resistor 302; and conductor 314 electrically interconnects across amplifier 282 conductors 290 and 280 and includes capacitor 316 in parallel with resistor 318 and variable resistor 320 (which are in series).

Representative component designations and preferred circuit values for the amplifier circuit 216 are:

| | |
|---|---|
| Capacitor 296 | .1 mf |
| Capacitor 304 | .1 mf |
| Capacitor 292 | 100 pf |
| Capacitor 316 | 1 mf |
| Circuit Common Connections 298, 306, 294 | — |
| Operational Amplifier 282 | 308 |
| Resistors 312 | 470 KΩ |
| Resistor 302 | 5 KΩ |
| Resistors 308 | 1.0 KΩ |
| Resistor 310 | 1.0 KΩ |
| Resistor 318 | 71.6 KΩ |
| Resistor 320 | 5 KΩ |

Strain gage bridge circuit 214 comprises variable strain gages 322, 324, 326 and 328 forming a bridge as shown. Conductors 284, 288, 286, 290 connect between strain gages 322, 324, strain gages 324, 328, strain gages 328, 326, and strain gages 326, 322, respectively, as illustrated.

Representative component descriptions and preferred circuit values for the strain gage bridge circuit 214 are:

| | |
|---|---|
| Strain Gages 322 | 350Ω |
| Strain Gages 324 | 350Ω |
| Strain Gages 326 | 350Ω |
| Strain Gages 328 | 250Ω |

Conductors 330 and 332 interconnects converter 262 with R-5 nor gate flip-flop 334 (which is in series with R-5 nor gate flip-flop 336) and gated oscillator (nand gate) 338, respectively. Conductor 340 connects to conductor 330 and to monostable multivibrator 342. Conductor 344 interconnects multivibrator 342 with monostable multivibrator 346 and includes capacitor 348 and resistor 350. Circuit common connection 352 extends from conductor 344. Multivibrator 342 is interconnected to conductor 344 by conductors 356, 358, 360 and 362. Conductor 364 with resistor 366 electrically interconnects conductor 330 and conductor 344, and conductor 368 interconnects multivibrators 342, 346. Resistor 370, capacitor 372 and diode electrically extend from conductor 344 and interconnect with multivibrator 346 with conductors 376, 378. Conductor 344 also interconnects with multivibrator 346 by conductors 382 and 380, flip-flop 336 connects to conductor 384 (which electrically extends from multivibrator 346) via conductor 388, and flip-flop nor gate 390 attaches to conductor 386 which electrically hooks to conductor 368. Gated oscillator 392, in series with oscillator 338, attaches to conductor 394 which in turn connects to conductor 396. Resistors 398, 400 and capacitor 402 electrically interconnect oscillators 338, 392, as shown. Conductor 404 interconnects conductor 396 and a six-decade counter 406 with the logic circuit 210 and includes in series capacitor 408, resistor 410, and R-5 nor gate flip-flop 412. Resistor 414 and circuit common connection 416 electrically extend from conductor 404. Conductor 418 interconnects conductor 404 and flip-flop blanking 420 which comprises extending therefrom as shown circuit common connections 422 and 424. Conductor 426 extends from flip-flop 420 to a 7-segment decoder (driver 430 of the display driver circuit 208) and conductor 428 interconnects flip-flop blanking 420 with a flip-flop tare 430 with conductor 432 (which interconnects R-5 flip-flop 390 and gated oscillator 434) connecting therebetween. Extending from flip-flop 430 are conductor 436 (connecting to six-decade counter 406), circuit common connection 438, conductor 440 (connecting to R-5 flip-flop 334), conductor 442 having capacitor 446 and circuit common connection 448 with resistor 450 and tare switch 452 and circuit common connection 454 extending therefrom, and conductor 444 having resistor 456 and connecting to conductor 442 as shown. Conductor 458 electrically interconnects gated oscillator 434 with the six-decade counter 406 and includes in series capacitor 460, resistor 462 and gated oscillator 464, and has resistor 466 extending therefrom.

Representative component designations and preferred circuit values for the control logic circuit 212 are:

| | |
|---|---|
| Resistor 350 | 470 K |
| Resistor 370 | 470 K |
| Resistor 366 | 1.5 K |
| Resistor 398 | 100 K |
| Resistor 400 | 47 K |
| Resistor 410 | 10 K |
| Resistor 414 | 47 K |
| Resistor 450 | 1.5 K |
| Resistor 456 | 47 K |
| Resistor 462 | 10 K |
| Resistor 466 | 47 K |
| Circuit Common Connections 352, 374, 416, 448, 454, 438, 422, 424 | — |
| Capacitor 348 | .033 mf |
| Capacitor 372 | .033 mf |
| Capacitor 402 | .002 mf |
| Capacitor 446 | 4.7 mf |
| Capacitor 408 | 220 pf |
| Capacitor 460 | 220 pf |
| Multivibrator 342 | 4528 A |
| Multivibrator 346 | 4528 B |
| Flip-flop 334 | 4001 |
| Flip-flop 336 | 4001 |
| Flip-flop 390 | 4001 |
| Flip-flop 412 | 4001 |
| Oscillator 338 | 4011 |
| Oscillator 392 | 4011 |
| Oscillator 434 | 4011 |
| Oscillator 464 | 4011 |
| Flip-flop blanking 420 | 4013 |
| Flip-flop tare 430 | 4013 |

In addition to six-decade counter 406, the logic circuit 210 also includes conductors 468, 470, 472 connecting therein diodes 474, 476, 478, 480, 492 and 484, as illustrated. Conductor 472 also includes capacitors 508 and 510. Conductor 486 electrically interconnects six-decade counter 406 and flip-flop 390. Conductor 492 having capacitor 490 connects to counter 406 in two places as shown. Circuit common connection 488 electrically extends from counter 406 as disclosed. Conductors 492, 494, 496, 498 electrically interconnect conductor 406 with decoder/driver 430. Conductors 500, 502, 504, 506 extend from counter 406 and connect to conductors 492, 494, 498, 496, respectively. Conductors 512, 514 and 516 having resistors 518, 520, 522, respectively, of the driver circuit 208, connect to transistors 524, 526, 528, respectively, of driver circuit 208, from the counter 406. Transistors 524, 526, 528 all connect to display 18, having digits 550, 552, 554 in series by conductors 556, 558, 560, 542, 546, 548, 550 with decoder (driver 530 and respectively including resistors 552, 554, 556, 558, 560, 562, 564. Resistor 566 extends from digit 530. The emitter electrodes of transistors 524, 526, 528 to decoder/driver 430 and has circuit common connection 523.

Representative component designations and preferred circuit values for the logic circuit 210 and display driver circuit 208 are:

| | |
|---|---|
| Capacitor 490 | 220 pf |
| Capacitor 508 | 220 pf |
| Capacitor 510 | 220 pf |
| Diodes 474, 476, 478, 480, 482, 484 | IN 4148 |
| Circuit Common Connections 488, 523 | — |
| Resistors 552, 554, 556, 558, 560, 562, 564 | 150 |
| Resistors 518, 520, 522 | 10 |
| Resistor 566 | 150 |
| Decoder/driver 430 | 4511 |
| Six-decade counter | 50595 |

With continuing reference to the drawings for operation of the invention, a suitable AC voltage is applied through plug 52, fuse 60, and switch 62 to the primary of transformer 58. The secondary of transformer 58 supplies a portion of the input AC voltage to the bridge rectifier consisting of diodes 70, 74, 80, and 82. Diodes 70 and 82 rectify the positive swing of the secondary voltage, capacitor 84 filters and smooths the positive swings into a +DC voltage that is applied to voltage regulator 72. The output of regulator 72 supplies a stable +12 DC voltage to the scale circuits. The operation of the diodes 74 and 80, capacitor 86 and regulator 76 are identical to the positive 12 volt supply, only then supply a negative polarity voltage of −12 volt DC.

The battery supply 50 operates as follows: again suitable AC voltage is applied through plug 92 and fuse 96 to the primary of transformer 98. The secondary of transformer 98 supplies a portion of the input voltage to diodes 108, 110, 112, and 114. These diodes rectify this AC voltage and apply it to capacitor 104 to produce a positive DC voltage. This voltage is applied to regulator 116 and with resistor 132 the output voltage is adjusted to a suitable level to charge the battery 140 through diode 118. Diode 118 serves to disconnect the regulator circuit from the battery to prevent discharge when the AC power is removed.

The battery supplies a positive 12 volts DC to the scale circuits through switch 120 and transistor 122. The circuitry associated with transistor 122 serves to turn off this transistor when the battery voltage drops to a predetermined value. This disconnects the battery from all circuits to prevent battery damage due to deep discharge.

I.C. 166 is an astable multivibrator which supplies pulses to the voltage quadrupler consisting of capacitors 184, 186, 198, 192, and diodes 194, 188, 196, and 200. This circuitry produces a negative 12 volts DC to supply the scale circuits.

The reference ±7 v supplies in the bridge circuit 206 work as follows: the ±12 volts DC produced in the preceeding supplies are applied to this circuitry. A precision +1.25 v DC is applied to I.C. 224 from I.C. 262. This voltage is constantly being compared to the voltage at the inverting input of I.C. 224. Resistor 254 is adjusted until the output voltage of transistor 234 equals +7 volts. This voltage now remains as stable as the +1.25 reference voltage. I.C. 244 has its non-inverting input connected to circuit ground and its inverting input connected between two equal resistors 248 and 250. With resistor 248 connected to the +7 output and the resistor 250 connected to the output of transistor 238, I.C. 244 forces the output of transistor 238 to equal the magnitude of the voltage on transistor 234 only opposite in polarity. The supply provides a stable ±7 v DC to the strain gage bridge 214 and bridge amplifier 216.

Figure 3:
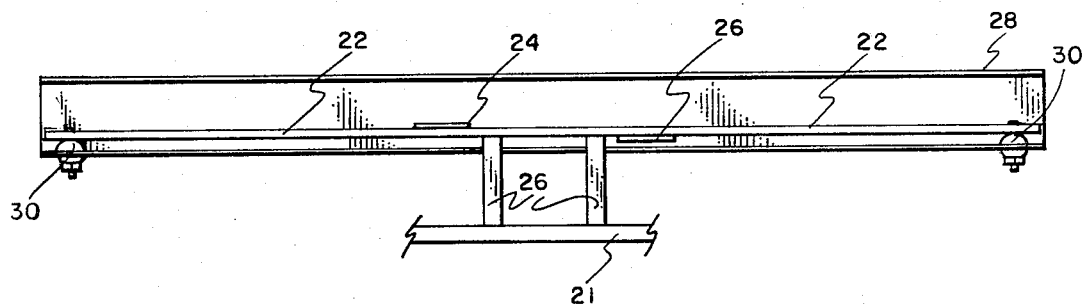
FIG. 3 is a vertical view of the strain gages attached to a beam supported by a pair of posts.

The strain gage bridge 214 consists of strain gages 322, 326, 324, and 328. Gages 322 and 326 mount on opposite sides of a weigh beam 22 as shown in FIG. 3. Gages 324 and 328 mount on another beam similarly. These two beams with other components shown in FIG. 3 make up the beam assembly. When weight is applied to the stop surface of these beam assemblies the gages 24 mounted on the top surface of the beam 22 expand and increase in resistance while the gages 26 mounted on the bottom of the beam 22 contract and decrease in resistance. In the strain gage bridge, gages 322 and 328 are top mounted and gages 324 and 326 are bottom mounted. With weight applied to the beam assemblies, the voltage at the junction of gages 322 and 326 will decrease in magnitude while the voltage at the junction of gages 324 and 328 will increase in magnitude. These different voltages are applied to the input terminals of I.C. 282 through resistors 308 and 310. I.C. 382 serves to amplify these different voltages from the strain gage bridge 214 to a suitable level reusable by the A-D converter 218. Resistors 318 and 320 serve as calibration adjusters for the proper full scale readings. Resistors 302 and 312 provide an adjustment to compensate for minute differences in the strain gages 214 and amplifier 216 and is normally adjusted slightly positive.

I.C. 262 provides the analog to digital conversion and is therefore termed the A-D converter, through a dual slope integration process. This process involves the integration of the voltage from the amplifier 216 over a known period of time T1 thus producing a positive going ramp voltage on capacitor 274. When T1 ends, T2 begins which ramps the voltage on capacitor 274 in the opposite direction and when the voltage reaches a point as determined internally in I.C. 262, the comparator out line 330 drops to a logic 0. This drop on line 330 triggers the monostable multivibrator 342. The output of this device produces a short positive pulse on line 396 and a short negative pulse on line 368. The positive pulse on line 396 is inverted by gate 412 and then is used to store the present counter value in I.C. 406 and also clocks a blanking or non-blanking signal through I.C. 420 to I.C. 430 depending on the state of I.C. 430. The negative pulse on line 368 triggers I.C. 346 and produces a positive pulse on line 384. This pulse is used to reset the flip-flop made of gates 334 and 336. The output of this flip-flop is line 332 and provides the ramp control to the A-D converter 262. This flip-flop is set by a positive pulse on line 440 from I.C. 406 which is a carry output from the internal counter of I.C. 406. This carry pulse is produced whenever the counter exceeds its maximum count of 999,999. The carry pulse is also used to reset I.C. 430 out of a tare condition and also unblank the display. The positive pulse on line 384 is also used to load the internal counter I.C. 406 with a number as determined by diodes 474, 476, 478, 480, 482, and 484. This number is sufficient to provide a positive offset in the A-D converter 262 thus reducing the effects of circuit noise on measurements. The counter in I.C. 406 is 6-decades and each decade is loaded in sequence or multiplexed by the circuitry internal to I.C. 406.

The data in this counter I.C. 406 is stored in internal latches in I.C. 406 in BCD form. This data is available on lines 496, 498, 492, and 494. Digit select lines 512, 514, and 516 are active as the data for that digit is available. This BCD data feeds I.C. 430 which is a decoder/driver that decodes the BCD data into the proper drive for the 7-segment displays 530, 532, and 534.

The display indicates the contents of the counter in I.C. 406 as the proper digit select lines 512, 514, and 516 are active. These lines scan at a rate above 35 Hz which makes this switching of data appear constant on the display.

The "Tare" features is activated by pressing switch 452. This signal is now on I.C. 430 and with an equal pulse on line 436, I.C. 430 blanks the display through I.C. 420 and I.C. 430 and also produces a positive pulse on line 368 from I.C. 342. This pulse on line 486 allows I.C. 406 to lead the contents of its counter into an internal register in I.C. 406 thus making the counter and register equal in value. This results in the subtraction of the value on the display at the the time the tare button 452 is pressed on all subsequent readings. If the display drops below 00.00 pounds, an early carry pulse on line 440 resets I.C. 430 into a tare condition which then operates as above. At the completion of a tare function, the output line 428 of I.C. 430 goes positive, and is inverted by gate 434 and applied to gate 464 through capacitor 460 and resistors 462 and 466. This pulse is again inverted by gate 464 and on line 458 the resulting pulse is a narrow positive pulse which clears the internal counter in I.C. 406.

To provide a master clock for all circuitry, a gated oscillator mode of gates 338 and 392 is provided. The frequency of this oscillator is determined by capacitor 402 and resistors 400 and 398. The oscillator is gated on and off by line 330 coming from the comparator output of the A-D converter 262. This allows for synchronization of the clock to the initial measurement start cycle of the A-D converter 262.

While particular embodiments of the invention have been shown and described herein, it is not intended that the invention be limited to such disclosure, but that changes and modifications can be made and incorporated within the scope of the invention.

I claim:

1. A digital scale having a digital screen for displaying digits comprising,
   a. a power supply means;
   b. a bridge supply means;
   c. a control logic means, said bridge supply means and control logic means being electrically engaged by said power supply means;
   d. strain gauge bridge means including at least two strain gauges and electrically engaged by said bridge supply means in two places;
   e. an amplifier means electrically engaging said strain gauge bridge means in two places;
   f. an A-D converter means electrically connected to said amplifier means and to said control logic means;
   g. a logic means electrically attached to said A-D converter means and to said control logic means; and
   h. a display driver means electrically connected to said logic means to said control logic means, and to said digital screen for displaying digits thereon;
   i. a base; a support means attached to said base; at least one beam attached to said support means, said beam having one of said two strain gauges attached on the top thereof and the other strain gauge connected on the bottom thereof; at least one U-shaped mounting member mounted on each beam; and a weigh plate means resting upon said U-shaped mounting member;
   said bridge supply means includes a bridge supply circuitry including a first conductor, a first operational amplifier means connected to said first conductor, a first transistor means electrically connected to said first operational amplifier means, a second conductor electrically connected to said operational amplifier means, and to the collector electrode of said transistor means, a third conductor connected to the emitter electrode of said first transistor means and to a second operational amplifier means; said third conductor having a first resistor means; a first capacitor means and a second circuit common connection means, in series and in order stated, electrically connecting from said first conductor; a second resistor means, a third resistor means, and a first circuit common connection means, in series and in order stated, electrically connecting from said third conductor between said first transistor means and said first resistor means, said third resistor being variable and electrically connecting to said first operational amplifier means; a third circuit common connection means electrically connected to said second operational amplifier means, a fourth conductor connecting from said third conductor, at a point between said second operational amplifier means and said first resistor means, to said second operational means, said fourth conductor including a fourth resistor means, and a second transistor means, in series and in order stated, from said third conductor; and a fifth conductor connecting from said second transistor means to said second operational amplifier means;
   said driver display means includes each of said display digits of said digital screen having a circuitry comprising a third transistor means having an emitter electrode electrically connected to a 7-segment decoder/driver means, a fifth resistor means electrically connected to said third transistor means, said display digits being electrically connected in series with each other and further in series with said 7-segment decoder/driver means;
   said logic means comprises a six decade counter means electrically connected in series with said 7-segment decoder/driver means, said fifth resistor means being electrically connected in series to said decade counter means;
   said control logic means comprises at least one monostable multivibrator means directly electrically connected to said six decade counter means, a first flip-flop means directly electrically attached to said 7-segment decoder/driver means, a second flip-flop means directly electrically engaging said flip-flop means, and at least one R-S flip-flop nor gate means electrically engaging said at least one monostable multivibrator means.

2. The digital scale of claim 1 wherein said power supply means includes a circuitry comprising at least a pair of input terminals connected to a power source, a transformer means electrically to said pair of input terminals, one of said input terminals including a fuse means and an on-off switch, a first transformer conductor, a second transformer conductor, a third transformer conductor, said transformers conductors electrically extending from said transformer, said first transformer conductor including a first diode means and a first volt regulator means, said second transformer conductor having a second diode means, said third transformer conductor including a third diode means and a second volt regulator means, a regulator conductor interconnecting said first and said second volt regulator means and electrically connected to said second transformer conductor, a first capacitor means electrically interconnecting the first and second transformer conductor at a point on said first transformer conductor between said first diode means and said first volt regulator means electrically interconnecting the second and third transformer conductor at a point on said third transformer conductor between said second diode means and said second volt regulator means, a third capacitor electrically interconnecting said first and second transformer conductor on the opposite side of said first volt regulator means with respect to said first capacitor means, a fourth capacitor electrically interconnecting said second and third transformers conductor on the opposite side of said second volt regulator means with respect to said second capacitor means, a fourth diode means electrically interconnecting said first transformer conductor and said third transformer conductor at a point in said first transformer conductor situated between said transformer and said first diode means and at a point on said third transformer conductor at a point between said second diode means and the point where said second capacitor means electrically connected to said third transformer conductor; and a fifth diode means electrically interconnecting said first transformer conductor and said third transformer conductor at a point on said first transformer conductor situated between said first diode means and the point where said first capacitor means electrically connected to said first transformer conductor, and at a point on said third transformer conductor at a point between said transformer and said third diode means.

3. The digital scale of claim 1 wherein the power supply means includes a circuitry comprising at least a pair of input terminals, a transformer means electrically connected to said pair of input terminals, one of said input terminals including a fuse means, a first transformer conductor, a second transformer conductor, said first and second conductors electrically extending from said transformer, said first transformer conductor including a first diode means, a volt regulator means, a second diode means, an on-off switch, a transistor, a capacitor means, a third diode means, in order stated, said second transformer conductor having a fourth diode means and a fifth diode means, a sixth diode means electrically interconnecting said first transformer conductor and said second transformer conductor at a point on said first transformer conductor between said transformer and said first diode means and at a point on said second transformer conductor between said fourth diode means and said fifth diode means, a seventh diode means electrically interconnecting said first transformer conductor and said second transformer conductor at a point on said second transformer conductor between said transformer and said fourth diode means and at a point on said first transformer conductor means between said first diode means and said first volt regulator means, a second capacitor means electrically interconnecting said first transformer conductor and said transformer conductor at a point on said first transformer conductor between said first diode means and said fifth diode means, a first conductor connecting to said first transformer conductor between said first volt regulator means and said second diode means and having a first resistor, a second resistor, a third resistor, an eighth diode means, said second resistor being variable by means of a variable conductor connected to said first volt regulator means, a second conductor connected to said first transformer conductor at a point between said on-off switch and said second diode means, said second conductor including a third capacitor means and a ninth diode means, a battery means having one and electrically connected to said first transformer conductor between said on-off switch means and the point where said second conductor connects to said first transformer conductor, and the other end of said battery connected between said third capacitor means and said ninth diode means, a third conductor connected to said first transistor means having a fifth resistor means, a second transistor, a tenth diode means, an eleventh diode means, a twelfth diode means, a thirteenth diode means, in series and in order stated, a fourth resistor means electrically connected across said fifth resistor means between said on-off switch means and said first transistor means and to said second transistor means, a sixth resistor means electrically connected to said second transistor means and on to said first transformer conductor at a point between said first transistor means and said first capacitor means; a fourth conductor electrically connected to an astable multivibrator means, said fourth conductor having a fourteenth diode means, a fourth capacitor means, a seventh resistor means, an eighth resistor means, a ninth resistor means, a tenth resistor means, a fifth capacitor means, a seventeenth diode means, an eighth capacitor means, in series and in order stated; a fifth conductor connected to said first transformer conductor at a point between said first capacitor means and said first transistor means, and to said fourth conductor between said eighth and ninth resistor and to said stable multivibrator means; a sixth conductor connected on said fourth conductor between said ninth resistor means and said tenth resistor means and to said stable multivibrator means, a seventh conductor connecting to said fourth conductor between said seventh and eighth resistor means, and to said stable multivibrator means, an eighth conductor connecting on said fourth conductor between said fourth capacitor means and said seventh resistor means and to said stable multivibrator means; a ninth conductor connected to said eighth conductor and to said stable multivibrator means, a nineteenth diode means connected to said multivibrator means; a tenth conductor connecting to said fourth conductor between said tenth resistor means and said fifth capacitor means, and between said seventeenth diode means and said eighth capacitor means, said tenth conductor including a fifteenth diode means, a sixteenth diode means, an eighteenth diode means, in order stated and in series, a seventh capacitor means electrically connecting on said tenth conductor across said sixteenth, eighteenth diode means and said eighth capacitor means between said fifteenth diode means and said sixteenth diode means, and electrically connecting on said fourth conductor between said eighth capacitor means and said stable multivibrator means, and a sixth capacitor means electrically connecting on said tenth conductor between said sixteenth diode means and said eighteenth diode means, and on said fourth conductor between said fifth capacitor means and said seventeenth capacitor means.

4. The digital scale of claim 1 wherein said strain gage bridge means includes a circuitry comprising a first conductor having a first strain gage means in series with a second strain gage, a third strain gage means in series with a fourth strain gage means, said first strain gage means and said second strain gage means being in parallel with said third strain gage means and said fourth train gage means; said first, second, third, and fourth strain gage being variable; a second conductor connecting between said first strain gage means and said second strain gage means; and a third conductor connecting between said third strain gage means and said fourth strain gage means.

5. The digital sacle of claim 4 wherein said amplifier means comprises a circuitry comprising an operational amplifier means electrically connected to said second conductor and to said third conductor; a fourth conductor connected to said operational amplifier means, said first conductor having one end connecting to said operational amplifier means from a point between said second strain gage means and said fourth strain gage means and comprising a seventh resistor means, the other end of said first conductor connecting to said operational amplifier means from a point between said first strain gage means and said third strain gage means and including an eighth resistor means, a fifth conductor electrically interconnecting said second conductor and said third conductor and including a fifth resistor means, said fifth resistor means being variable, said fifth conductor means being variable, said fifth conductor additionally including a fourth capacitor means and a third circuit common connection means in series; a sixth resistor means electrically connecting across said seventh resistor means from a point on said first conductor between said seventh resistor means and said operational amplifier means to said variable fifth resistor means; said second conductor having a first capacitor means and a first circuit common connection means connected, in order stated, thereto at a point between the point where said fifth conductor connects to the second conductor and said operational amplifier means; a second capacitor means and a second circuit common connection means connected in series to said operational amplifier means, a sixth conductor connecting from said fourth conductor to said first conductor at a point between said eighth resistor means and said operational amplifier means, and sixth conductor having a third capacitor means in parallel with a ninth resistor means and a tenth resistor means, said ninth and tenth resistor means being in series.

6. The digital scale of claim 5 wherein said A-D converter means comprises a circuitry including an analog to digital converter means connected to said fourth conductor, a fourth diode means electrically connected to said analog to digital converter means, a fifth diode means electrically connected to said analog to digital converter means, a fourth capacitor means electrically connected to said analog to digital converter means, a fifth capacitor means in series with a sixth diode means electrically connected to said analog to digital converter, a seventh conductor electrically attached to said analog to digital converter, said seventh conductor having an eleventh resistor means, an eighth conductor connecting to said seventh conductor and to said analog to digital converter in two places, a ninth conductor connecting from said analog to digital converter to said eighth conductor, said eighth conductor including a seventh diode means situated in between the point where the ninth conductor attaches to the eighth conductor and the point where the seventh conductor connects to the eighth conductor.

* * * * *